(12) United States Patent
Sayama et al.

(10) Patent No.: US 6,626,138 B2
(45) Date of Patent: Sep. 30, 2003

(54) INTERNAL COMBUSTION ENGINE

(75) Inventors: Takehiko Sayama, Wako (JP);
Takatoshi Ogami, Wako (JP); Yoshio Yamamoto, Wako (JP); Hiromitsu Sato, Wako (JP); Kazuyuki Iwata, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/032,550

(22) Filed: Jan. 2, 2002

(65) Prior Publication Data
US 2002/0088424 A1 Jul. 11, 2002

(30) Foreign Application Priority Data
Jan. 10, 2001 (JP) ........................ 2001-003093

(51) Int. Cl.$^7$ ............................ H02K 7/18; F02B 67/00
(52) U.S. Cl. .................................. 123/149 R; 322/90
(58) Field of Search ........................ 322/90; 123/149 R, 123/149 D, 185.3; 30/381

(56) References Cited
U.S. PATENT DOCUMENTS
3,747,649 A * 7/1973 Densow et al. ............... 30/381
5,287,518 A * 2/1994 Miller et al. .................. 322/90

FOREIGN PATENT DOCUMENTS
JP        5-18342    * 1/1993
JP       09-182371     7/1997

* cited by examiner

Primary Examiner—Noah P. Kamen
(74) Attorney, Agent, or Firm—Armstrong, Westerman & Hattori, LLP.

(57) ABSTRACT

An internal combustion engine (E) includes a crankshaft (5), and a bearing cap (8) supporting the crankshaft (5) for rotation. Permanent magnets (20) serving as magnetic field creating members are attached to the balance weights (W1a to W6a) formed integrally with the webs (W1 to W6) of the crankshaft (5). Coils (21) are attached to the bearing cap bodies (A1 to A4) of the bearing cap (8). The permanent magnets (20) and the coils (21) form electromechanical transducers (M1 to M6). A small gap can be formed and maintained between the permanent magnets (20) and the corresponding coils (21) with reliability without entailing substantial increase in the size of the internal combustion engine. The electromechanical transducers (M1 to M6) are controlled according to the operating mode of the internal combustion engine so as to serve as electric motors or generators.

17 Claims, 7 Drawing Sheets

INTERNAL COMBUSTION ENGINE

BACKGROUND OF THE INVENTION

1. Field of the Invention

The present invention relates to an internal combustion engine provided with an electromechanical transducer having the functions of an electric motor and an electric generator, an electric motor or a generator.

2. Description of the Related Art

An engine provided with an electromechanical transducer disposed in a crankcase and capable of operating as both a motor and a generator is disclosed in JP-A 182371/1997. The electromechanical transducer of this prior art engine has a permanent magnet attached to the large end of a connecting rod connecting a reciprocating piston and a crankshaft, and a stator coil placed on a base fixed to a crankcase formed of a lower part of a cylinder block and an oil pan attached to the cylinder block. The permanent magnet revolves together with the large end of the connecting rod relative to the stator coil as the crankshaft rotates. Consequently, an electromotive force is generated in the stator coil by the electromagnetic interaction between the permanent magnet and the stator coil, and the electromechanical transducer functions as a generator. When an ac current is supplied to the stator coil from a battery, an electromagnetic force is exerted on the permanent magnet in a direction tangent to the path of revolution of the permanent magnet by the electromagnetic interaction between the ac current and the permanent magnet, and the electromechanical transducer functions as a motor.

In this prior art engine, the large end of the connecting rod holding the permanent magnet revolves about the axis of the crankshaft and turns alternately in opposite directions about the axis of a crankpin connected to the large end of the connecting rod. Therefore, the size of a gap between the permanent magnet and the stator coil cannot be maintained if constant, the gap is narrowed to the least size only for a very short time, and hence the electromechanical transducer is unable to function efficiently as a motor or a generator.

The present invention has been made in view of such a problem and it is therefore a first object of the present invention to provide an internal combustion engine provided with an electric device having a magnetic member and a coil, such as an electric motor, a generator or an electromechanical transducer, formed in a comparatively small size, and capable of constantly maintaining a small gap between the magnetic member and the coil while the magnetic member is opposite to the coil.

A second object of the present invention is to improve, when the electric device is an electric motor, the effect of the electric motor in assisting the rotation of a crankshaft included in the internal combustion engine, to improve, when the electric device is a generator, the power generating efficiency of the generator, and to suppress increase in the weight of the internal combustion engine.

SUMMARY OF THE INVENTION

According to the present invention, an internal combustion engine comprises: a cylinder block, a crankshaft, a bearing cap fastened to the cylinder block so as to hold the crankshaft for rotation on the cylinder block, and a crank chamber forming member forming a crank chamber; wherein magnetic field creating members are fixed to parts of the crankshaft in the crank chamber so as not to move relative to the crankshaft, coils are held on the bearing cap in the crank chamber, and the magnetic field creating members and the coils form at least electric motors, generators or electromechanical transducers.

According to the present invention, since the magnetic field creating members and the coils forming electric motors, generators or electromechanical transducers are held on the crankshaft and the bearing cap disposed in the crank chamber, the effect of combination of the electric motors, the generators or the electromechanical transducers with the internal combustion engine on increase in the size of the internal combustion engine is suppressed. Since the magnetic field creating members are fixed to the crankshaft, the small gap between the magnetic field creating members and the coils held on the bearing cap can be easily maintained constant while the magnetic field creating members turning together with the crankshaft is opposite to the coils. Thus, a large assistant force assisting the rotation of the crankshaft can be generated when the magnetic field creating members and the coils form electric motors, and power can be generated at a high power generating efficiency when the magnetic field creating members and the coils form generators. Since the coils are held on the bearing cap, the coils can be attached to and removed from the cylinder block together with the bearing cap, which facilitates work for installing the coils in the crank chamber, the coils can be effectively cooled by a large amount of oil lubricating the main bearings of the internal combustion engine, and, consequently, the electric motors, the generators or the electromechanical transducers operate at a high efficiency.

The bearing cap may comprise a plurality of bearing cap bodies and connecting member connecting the bearing cap bodies, and the coils may be disposed on the side of the axis of the crankshaft with respect to the connecting members.

Thus, the coils can be firmly fastened to the bearing cap, which is advantageous to maintaining the gap between the magnetic field creating members and the coils constant. Since the coils are disposed in a space on the side of the axis of the crankshaft with respect to the connecting member, the coils do not increase the size of the internal combustion engine.

The bearing cap may include a plurality of bearing cap bodies and a connecting member connecting the bearing cap bodies, and the coils may be held on the connecting member.

Thus, the magnetic field creating members and the coils can be disposed at long distances, respectively, from the axis of the crankshaft. Therefore, a high assistant torque assisting the rotation of the crankshaft can be produced when the magnetic field creating members and the coils form electric motors. Since the magnetic field creating members move at a high circumferential speed, power can be generated at a high generating efficiency when the magnetic field creating members and the coils form generators. Since the coil is held on the connecting member for enhancing the rigidity of the plurality of bearing cap bodies, the coils can be firmly held on the highly rigid connecting member, which is advantageous to maintaining the small gap between the magnetic field creating members and the coils constant.

According to the present invention, an internal combustion engine includes: a crankshaft, and crank chamber forming members forming a crank chamber; wherein magnetic field creating members are fixed to parts of the crankshaft in the crank chamber, coils are held on the crank chamber forming members in the crank chamber, and the magnetic field creating members and the coils form at least electric motors, generators or electromechanical transducers.

The construction according to the present invention suppresses the effect of the formation of electric motors, generators or electromechanical transducers in the internal combustion engine on increasing the size of the internal combustion engine. Since the magnetic field creating members are fixed to the crankshaft, the small gap between the magnetic field creating members and the coils held on the crank chamber forming members can be easily maintained constant while the magnetic field creating members turning together with the crankshaft is opposite to the coils. Thus, a large assistant force assisting the rotation of the crankshaft can be generated when the magnetic field creating members and the coils form electric motors, and power can be generated at a high power generating efficiency when the magnetic field creating members and the coils form generators.

The coils may be held on coil holders disposed in the crank chamber so that the gap between the magnetic field creating members and the coil can be maintained constant.

Thus, the small gap between the magnetic field creating members and the coils held on the coil holding chamber can be easily maintained constant while the magnetic field creating members turning together with the crankshaft are opposite to the coils, a large assistant force assisting the rotation of the crankshaft can be generated when the magnetic field creating members and the coils form electric motors, and power can be generated at a high power generating efficiency when the magnetic field creating members and the coils form generators.

Desirably, the magnetic field creating members are held on balance weights included in the crankshaft. Thus, the magnetic field creating members serve as balance weights, increase in the weight of the internal combustion engine by the combination of electric motors, generators or electromechanical transducers with the internal combustion engine can be suppressed, and increase in the size of the internal combustion engine can be suppressed because the balance weights are originally disposed in the crank chamber.

The crank chamber forming members may include an oil pan, and the coils may be immersed in oil contained in the oil pan. Thus, the coils can be effectively cooled by a large amount of oil contained in the oil pan and, consequently, the electric motors, the generators or the electromechanical transducers operate at a high efficiency.

DESCRIPTION OF THE PREFERRED EMBODIMENTS

Preferred embodiments of the present invention will be described hereinafter with reference to FIGS. 1 to 7.

Figure 1:
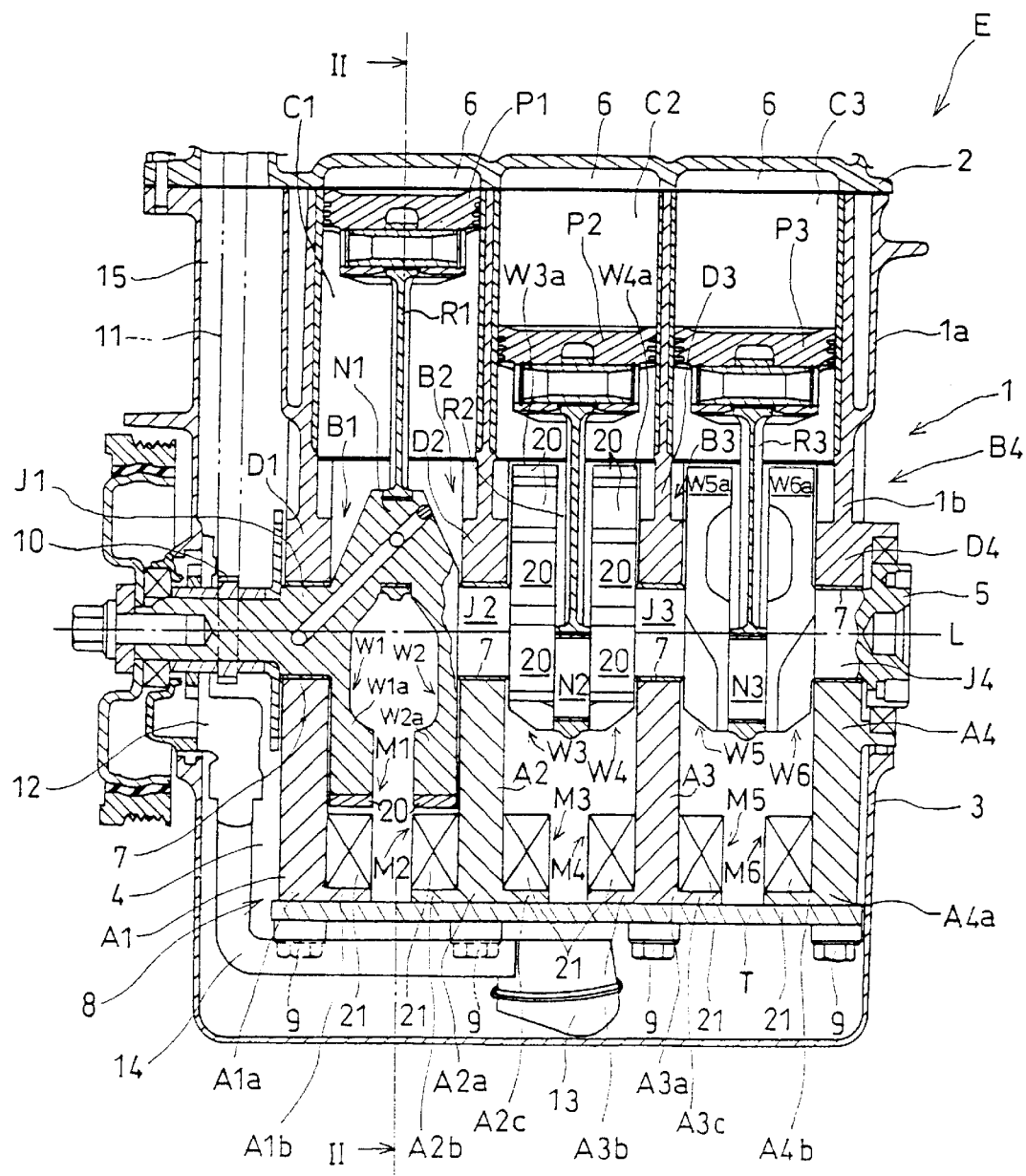
FIG. 1 is a longitudinal sectional view of an essential part of an internal combustion engine in a first embodiment according to the present invention, taken on a plane including the axis of a crankshaft included in the internal combustion engine.
Figure 2:
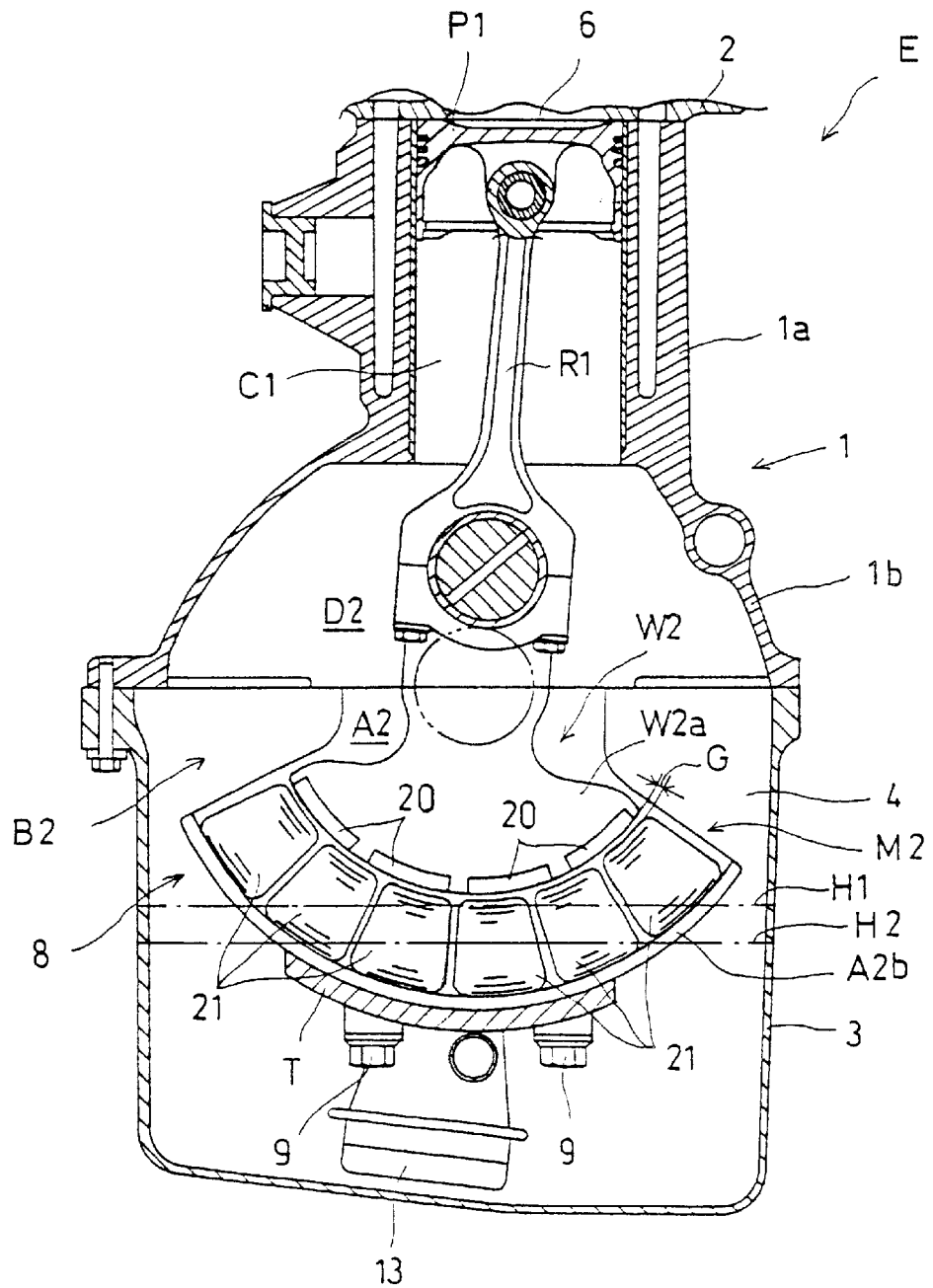
FIG. 2 is a sectional view taken on line II—II in FIG. 1.
Figure 3A:
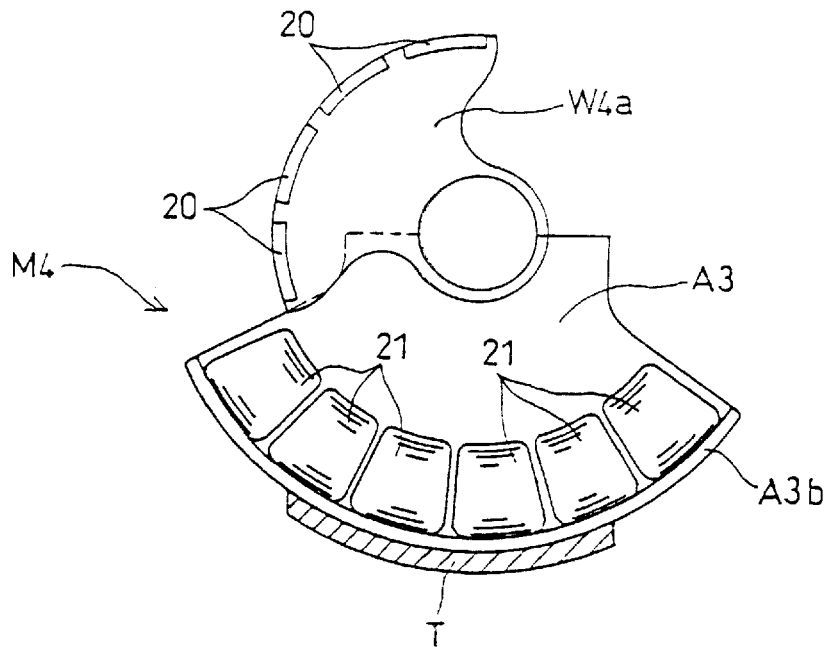
FIGS. 3A and 3(b) are views of assistance in explaining the positional relation with respect to a circumferential direction between permanent magnets and coils in a pair of electromechanical transducers in a state shown in FIG. 2.
Figure 3B:
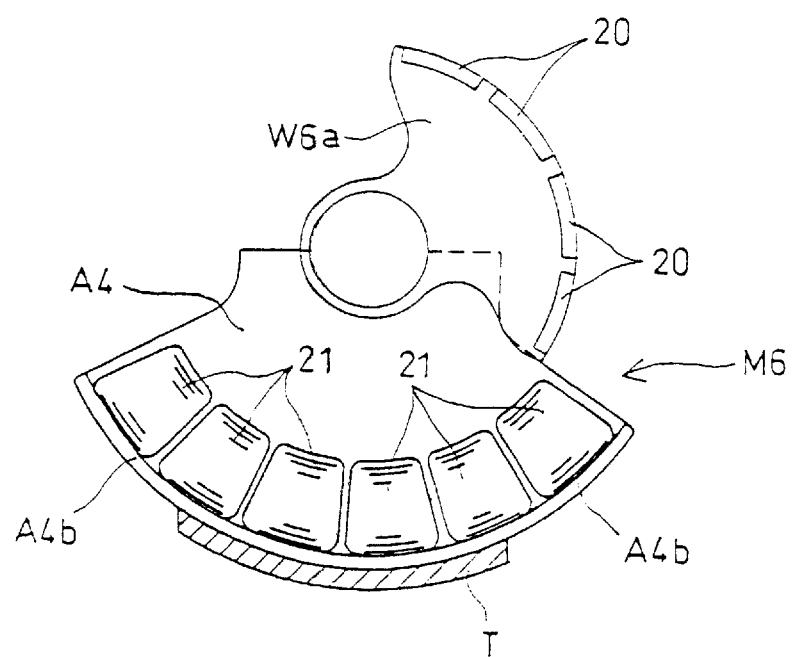

Referring to FIGS. 1 and 2 showing an internal combustion engine E in a first embodiment according to the present invention, the internal combustion engine E, which is a three cylinder four-stroke cycle straight internal combustion engine, has an engine body including a cylinder block 1, a cylinder head 2 joined to the upper end of the cylinder block 1, and an oil pan 3 joined to the lower end of the cylinder block 1. The cylinder block 1 has a cylinder unit 1a formed by integrally connecting three cylinders C1, C2 and C3 on the side of the cylinder head 2, and a crankcase unit 1b on the side of the oil pan 3. The crankcase unit 1b and the oil pan 3 define a crank chamber 4. A crankshaft 5 is disposed in the crank chamber 4 with its axis L extended in a parting plane between the crankcase unit 1b and the oil pan 3. In the first embodiment, the crankcase unit 1b and the oil pan 3 are crank chamber forming members. Pistons P1, P2 and P3 are fitted for axial sliding movement in the cylinders C1, C2 and C3, respectively. The pistons P1 to P3 are driven for reciprocation by combustion pressure produced in combustion chambers 6 formed between the pistons P1 to P3 and the cylinder head 2 to drive the crankshaft 5 for rotation through connecting rods R1, R2 and R3.

The crankshaft 5 has four journals J1, J2, J3 and J4. The four journals J1 to J4 are supported in four main bearings 7 having slide bearings on bearing structures B1, B2, B3 and B4 in the crank chamber 4. The bearing structures B1 to B4 consist of bearing parts D1, D2, D3 and D4 of the cylinder block 1, and a bearing cap 8 joined to the bearing parts D1 to D4. The main bearings 7 are held in bearing holes formed by joining the bearing cap 8 to the bearing structures D1 to D4. The bearing cap 8 has four bearing cap bodies A1, A2, A3 and A4 joined to the bearing parts D1 to D4, respectively, and a plate-shaped connecting member T joined to the bearing cap bodies A1 to A4 to provide with bearing cap 8 with a high rigidity. The connecting member T joined to peripheral parts A1a, A2a, A3a and A4a is fastened together with the four bearing cap bodies A1 to A4 to the bearing parts D1 to D4 with bolts 9. Thus, the bearing cap 8 is fastened to the cylinder block 1.

In the crankshaft 5, a pair of crank webs W1 and W2 are formed axially adjacently to the two bearing structures B1 and B2, a crankpin N1 is extended between the crank webs W1 and W2, and the connecting rod R1 connected to the piston P1 fitted in the cylinder C1 is connected to the crankpin N1. Similarly, a pair of crank webs W3 and W4 are formed axially adjacently to the two bearing structures B2 and B3, a crankpin N2 is extended between the crank webs W3 and W4, and the connecting rod R2 connected to the piston P2 fitted in the cylinder C2 is connected to the crankpin N2, and a pair of crank webs W5 and W6 are formed axially adjacently to the two bearing structures B3 and B4, a crankpin N3 is extended between the crank webs W5 and W6, and the connecting rod R3 connected to the piston P3 fitted in the cylinder C3 is connected to the crankpin N3. The crankshaft 5, the crank webs W1 to W6 and the crankpins N1 to N3 are formed integrally in a single piece. The three crankpins N1 to N3 are arranged at angular intervals of 120°. The crank webs W1 to W6 do not move relative to the crankshaft 5.

The crank webs W1 to W6 have balancing parts W1a, W2a, W2a, W3a, W4a, W5a and W6a provided with balance weights and formed opposite to the crankpins N1 to N3, respectively, with respect to the axis L of the crankshaft 5. The balancing parts W1a to W6a produce forces capable of counterbalancing primary inertial forces acting on reciprocating parts that reciprocate according to the reciprocation of the pistons P1 to P3, such as the pistons P1 to P3, members attached to the pistons P1 to P3, such as piston rings and piston pins, and the connecting rods R1 to R3. Each of the pair of balancing parts W1a and W2a, the pair of balancing weights W3a and W4a, and the pair of balancing parts W5a and W6a respectively corresponding to the pistons P1 to P3 are at the same phase. The balancing parts W1a to W6a are disposed axially adjacently to the corresponding bearing structures B1 to B4.

A drive sprocket 10 is fixedly mounted on a left end part of the crankshaft 5 projecting to the left, as viewed in FIG. 1, from the bearing structure B1. A timing chain 11 is extended between the driving sprocket 10, and cam sprockets, not shown, respectively fixedly mounted on a suction valve operating camshaft and an exhaust valve operating camshaft included in a valve mechanism disposed on the cylinder head 2. Two suction valves and two exhaust valves combined with each of the cylinders C1 to C3 are opened and closed at predetermined times by cams formed integrally with the camshafts driven by rotative driving force of the crankshaft 5 transmitted through the timing chain 11.

Referring to FIG. 2, the quantity of an oil contained in the oil pan 3 is determined such that a first oil level H1, i.e., an oil level while the internal combustion engine E is stopped, is slightly below the level of the lower ends of the balancing parts W1a to W6a in a state where the pistons P1 to P3 are at their top dead centers, and a second oil level H1, i.e., an oil level while the internal combustion engine E is in operation, is below the first oil level H1. An oil pump 12 driven by the crankshaft 5 sucks the oil through an oil strainer 13 and a suction pipe 14 from the oil pan 3 and delivers the oil to a main gallery formed in the cylinder block 1. Then, the oil is supplied from the main gallery to sliding parts requiring lubrication including the main bearings 7 supporting the crankshaft 5, connecting members connecting the crankpins N1 to N3 and the connecting rods R1 to R3, the sliding surfaces of the pistons P1 to P3 and the cylinders C1 to C3. The oil supplied to the sliding parts for lubrication drips into the crank chamber 4 and is collected in the oil pan 3 after lubrication. A large quantity of the oil lubricated the main bearings 7 flows around the bearing cap bodies A1 to A4 of the bearing cap 8, and the oil lubricated the sliding parts drips in the vicinity of the connecting member T attached to the bearing cap bodies A1 to A4 located near the bottom wall of the oil pan 3. Part of the oil supplied into the main gallery lubricates the sliding parts of the valve mechanism flows after lubrication through a return passage formed in the cylinder block 1 and a chain chamber 15 holding the timing chain 11 into the oil pan 3.

An electromechanical transducer formed in the internal combustion engine E will be described hereafter. Referring to FIG. 2, the balancing parts W1a to W6a of the crank webs W1 to W6 have the shape resembling a sector having sides forming a central angle of about 120°. Four permanent magnets 20, i.e., magnetic field creating members, are fixedly fitted by press fit in recesses formed at substantially equal intervals in a peripheral part of each of the balancing parts W1a to W6a, the peripheral part being most apart from the rotational axis L of the crankshaft 5. The permanent magnets 20 serve also as balance weights. The permanent magnets 20 are always above the first oil level H1.

The peripheral parts A1a to A4a of the bearing cap bodies A1 to A4 are provided with flanges A1b, A2b and A2c,
flanges A3b and A3c, and a flange A4b, respectively. Six coils 21 are fixed to each of the flanges A1b, A2b and A2c, A3b and A3c, and A4b. The coils 21 are disposed on the radially outer side of the permanent magnets 20 along a circular arc in an angular range of about 120°radially opposite to the permanent magnets 20. The coils 21 are arranged so that a fixed, radial, small gap G is formed between the radially inner surfaces of the coils 21 and the permanent magnets 20. Therefore, the bearing cap bodies A1 to A4 serve as coil holding parts and the coils 21 are disposed in spaces on the side of the axis L of the crankshaft 5 relative to the connecting member T. Parts of the coils 21 are below the first oil level H1 or the second oil level H2 and are immersed in the oil. Since the coils 21 are provided at such positions that they are in contact with the oil lubricating the bearing structure for the crankshaft, the coils 21 are cooled effectively.

Thus, each of the crank webs W1 to W6 is provided with the plurality of permanent magnets 20, and the permanent magnets 20 and the coils 21 form six electromechanical transducers M1, M2, M3, M4, M5 and M6. As obvious from FIGS. 3A and 3B, since the permanent magnets 20 and the coils 21 are arranged in the foregoing arrangement, at least the permanent magnets 20 of one of the three pairs of the electromechanical transducers M1 and M2, the electromechanical transducers M3 and M4, and the electromechanical transducers M5 and M6 having the permanent magnets 20 respectively held on the three pairs of balance weights W1a and W2a, balance weights W3a and W4a and the balance weights W5a and W6a of the same phase are opposite to the corresponding coils 21 with the gap G formed between the permanent magnets 20 and the corresponding coils 21 while the crankshaft 5 of the internal combustion ending E rotates for one full turn. Thus, an electromagnetic action occurs between the permanent magnets 20 and the coils 21 of at least one of the three pairs of the electromechanical transducers M1 and M2, the electromechanical transducers M3 and M4, and the electromechanical transducers M5 and M6.

Figure 4:
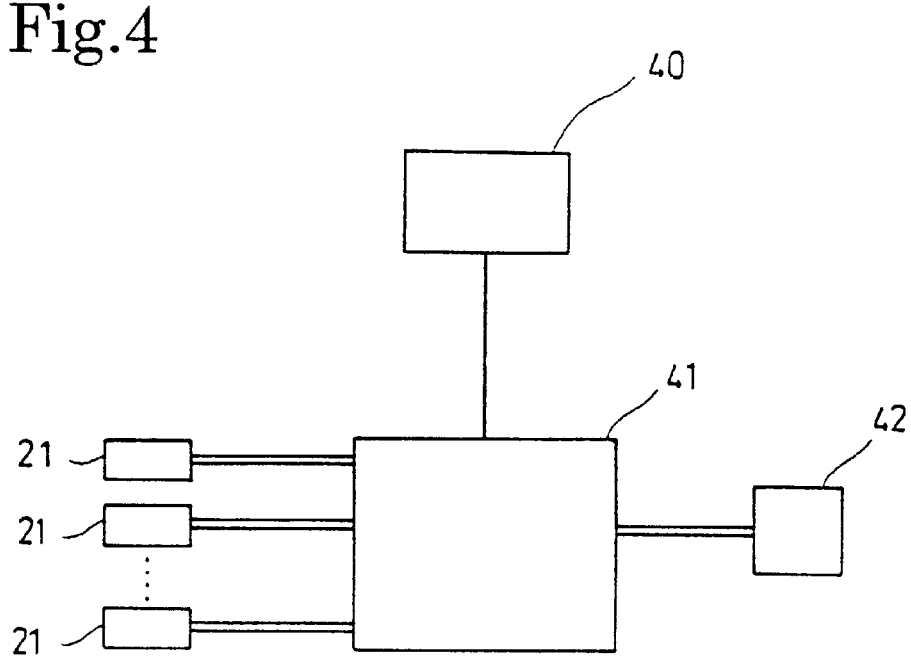
FIG. 4 is a view of assistance in explaining a coil control system.

Referring to FIG. 4, the coils 21 of the electromechanical transducers M1 to M6 are connected to a power drive unit (PDU) 41 controlled by an electronic controller 40. The PDU 41 makes the electromechanical transducers M1 to M6 function as ac motors (permanent-magnet ac synchronous motors). In an assisting operation mode, in which the electromagnetic action between the permanent magnets 20 and the coils 21 generates assistant force for assisting the rotation of the crankshaft 5, driving power is supplied to the electromechanical transducers M1 to M6. In a regenerative operation mode, in which the rotative energy of the crankshaft 5 is converted into electric power by the electromagnetic action between the permanent magnets 20 and the coil 21, the power generated by the electromechanical transducers M1 to M6 is stored in a power storage device 42. The power stored in the power storage device is used as the driving power for driving the electromechanical transducers M1 to M6 in the assisting operation mode, and is used for charging a battery after adjusting the voltage to an appropriate voltage.

Operations and effects of the embodiment will be described hereinafter.

The internal combustion engine E is operated, and the crankshaft 5 is driven for rotation by the pistons P1 to P3. Then, the permanent magnets 20 of the electromechanical transducers M1 to M6 held on the balance weights W1a to W6a pass by the coils 21 held on the bearing cap bodies A1 to A4 along a path on the radially inner side of the coils 21 and spaced from the coils 21 by the small gap G. In an operating mode where the output of the internal combustion engine E needs to be increased for acceleration, the electronic controller 40 gives a command to the PDU 41 to supply driving power to the electromechanical transducers M1 to M6 to use the electromechanical transducers M1 to M6 as electric motors to assist the rotation of the crankshaft 5. In an operating mode where the output of the internal combustion engine E needs to be decreased for deceleration or the storage device 42 needs to be charged, the electronic controller 40 gives a command to the PDU 41 to stop supplying the driving power to the coils 21 to use the electromechanical transducers M1 to M6 as generators and power generated by the electromechanical transducers M1 to M6 is supplied to the storage device 42.

Thus, the permanent magnets 20 and the coils 21 of the electromechanical transducers M1 to M6 are held on the crank webs W1 to W6 and on the bearing cap bodies A1 to A4, respectively, in the crank chamber 4. Therefore, increase in the size of the internal combustion engine E due to the incorporation of the electromechanical transducers M1 to M6 into the internal combustion engine E is suppressed. Since the coils 21 are disposed in the space on the side of the axis L crankshaft 5, increase in the size of the internal combustion engine E can be suppressed. Since the crank webs W1 to W6 holding the permanent magnets 20 are immovable relative to the crankshaft 5, the crank webs W1 to W6 rotates together with the crankshaft 5 and hence the small gaps G between the permanent magnets 20 and the coils 21 held on the bearing cap bodies A1 to A4 can be easily maintained constant, the electromechanical transducers M1 to M6 are able to function as generators that generate large assisting force for assisting the rotation of the crankshaft 5, and the electromechanical transducers M1 to M6 are able to function as generators at a high power generating efficiency. Since the electromechanical transducers M1 to M6 are provided with the permanent magnets 20 and the coils 21, and the small gaps G between the permanent magnets 20 and the corresponding coils can be maintained constant, the electromechanical transducers M1 to M6 are able to function as electric motors capable producing high assisting force and are able to function as generators capable of generating power at a high efficiency. Since the coils 21 are held on the bearing cap bodies A1 to A4, the bearing cap bodies A1 to A4 holding the coils 21 can be attached and removed from the cylinder block unit 1b of the cylinder block 1. Thus, work for disposing the coils 21 in the crank chamber 4 is facilitated. Since the large quantity of oil lubricated the main bearings 7 flow in the vicinity of the bearing cap bodies A1 to A4, the coils 21 can be effectively cooled by the oil and the efficiency of the electromechanical transducers M1 to M6 is improved.

Since the permanent magnets 20 held on the balance weights W1a to W6a of the crank webs W1 to W6 of the crankshaft 5 can be used as balance weights increase in weight of the internal combustion engine E due to the combination of the electromechanical transducers M1 to M6 with the internal combustion engine E can be suppressed.

Since the coils 21 are fixed to the flanges A1b, A2b and A2c, the flanges A3b and A3c, and the flange A4b formed in the peripheral parts A1a to A4a of the bearing cap bodies A1 to A4, respectively, the distance between the axis L of the crankshaft 5 and the coils 21 is very long, and the permanent magnets 20 held on the balance weights W1a to W6a, similarly to the coils 21, can be disposed at a long distance from the axis L. Consequently, the electromechanical transducers M1 to M6 are able to function as electric motors capable of producing a large assisting torque by the assisting force assisting the rotation of the crankshaft 5 and are able to function as generators, in which the permanent magnets 20 move at a high circumferential speed, capable of generating power at a high efficiency.

Since parts of the coils 21 are below the first oil level H1 or the second oil level H2 and are immersed in the oil contained in the oil pan 3, the coils 21 can be cooled by the large quantity of oil contained in the oil pan 3. Thus, cooling of the coils 21 can be further promoted and the efficiency of the electromechanical transducers M1 to M6 is improved. Since the balance weights W1a to W6a and the permanent magnets 20 are above the first oil level H1 and are not immersed in the oil while the internal combustion engine E is stopped, the balance weights W1a to W6a and the permanent magnets 20 do not stir the oil while the internal combustion engine E is in operation, the oil does not exert resistance against the rotation of the crankshaft 5 and mixing of the oil and air can be prevented.

Since at least the permanent magnets 20 of one of the three pairs of the electromechanical transducers M1 and M2, the electromechanical transducers M3 and M4, and the electromechanical transducers M5 and M6 are opposite to the corresponding coils 21 with the gap G formed between the permanent magnets 20 and the corresponding coils 21 while the crankshaft 5 of the internal combustion ending E rotates for one full turn, a stable assisting operation and a stable regenerative operation can be achieved, and the variation of the rotating speed of the crankshaft 5 assisted by the electromechanical transducers M1 to M6 can be suppressed.

Since the coils 21 are held on the bearing cap 8, a force that reduces explosion load produced by combustion in the combustion chamber 6 acts between the coils 21 and the permanent magnets 20 held on the balance weights W1a to W6a. Thus, explosion load that is exerted by the crankshaft 5 on the bearing parts B1 to B4 can be reduced and hence the life of the main bearings 7 can be extended.

Since the permanent magnets 20 and the coils 21 of the electromechanical transducers M1 to M6 are disposed opposite to each other on the opposite sides of the gap G, in crease in the width of the internal combustion engine E, i.e., a dimension along the axis L, can be prevented.

Figure 5:
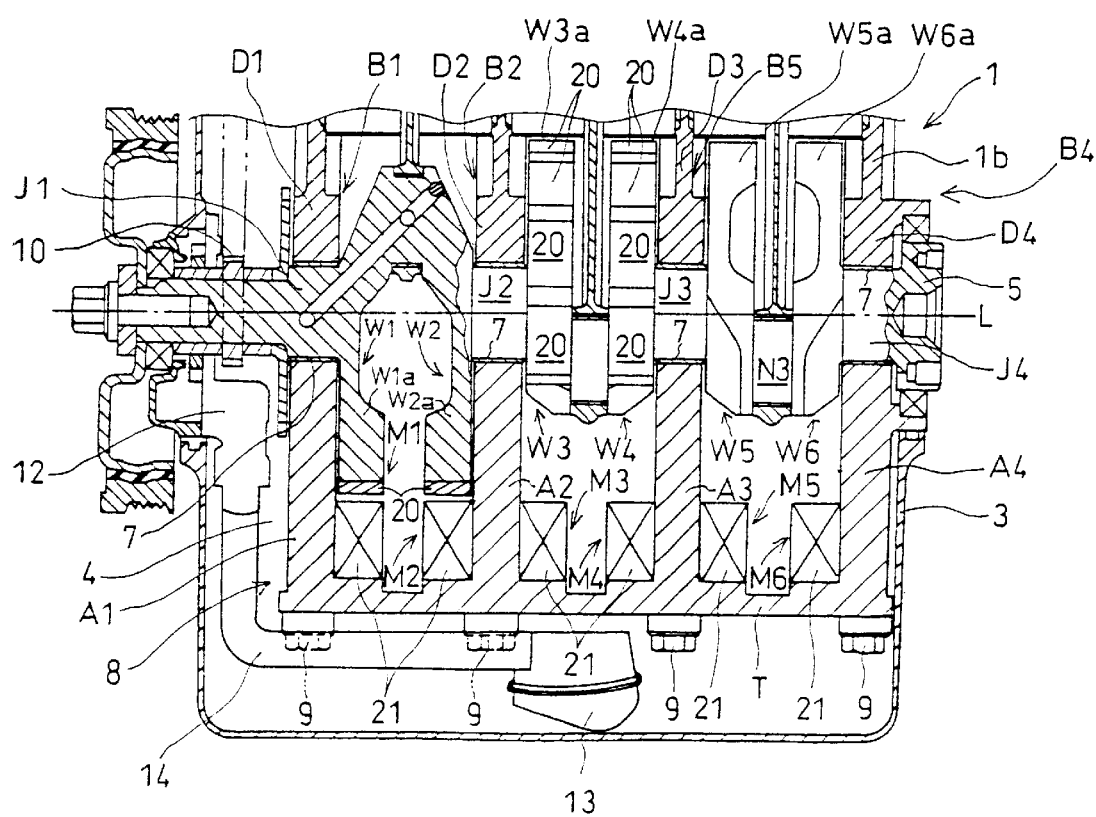
FIG. 5 is a sectional view, similar to FIG. 2, of an internal combustion engine in a second embodiment according to the present invention.

An internal combustion engine in a second embodiment according to the present invention will be described with reference to FIG. 5, in which parts like or corresponding to those of the internal combustion engine in the first embodiment are denoted by the same reference characters and the description thereof will be omitted.

The second embodiment differs from the first embodiment only in that a member corresponding to the connecting member T shown in FIG. 1 is formed integrally with flanges A1b, A2b, A2c, A3b, A3c and A4b, and bearing cap bodies A1 to A4. A bearing cap 8 serves as a coil holding member. Since the coils 21 are held on the bearing cap 8 integrally provided with the bearing cap bodies A1 to A4 and the connecting member T, the internal combustion engine in the second embodiment needs less parts than the internal combustion engine in the first embodiment, errors in the positions of the coils 21 are reduced and uniform gaps G can be easily formed for all the coils 21. The coils 21 can be firmly fixed to parts of the rigid bearing cap 8 formed in one piece at positions near the connecting member T, which is advantageous to maintaining the gaps G between the permanent magnets 20 and the coils 21 constant.

Figure 6:
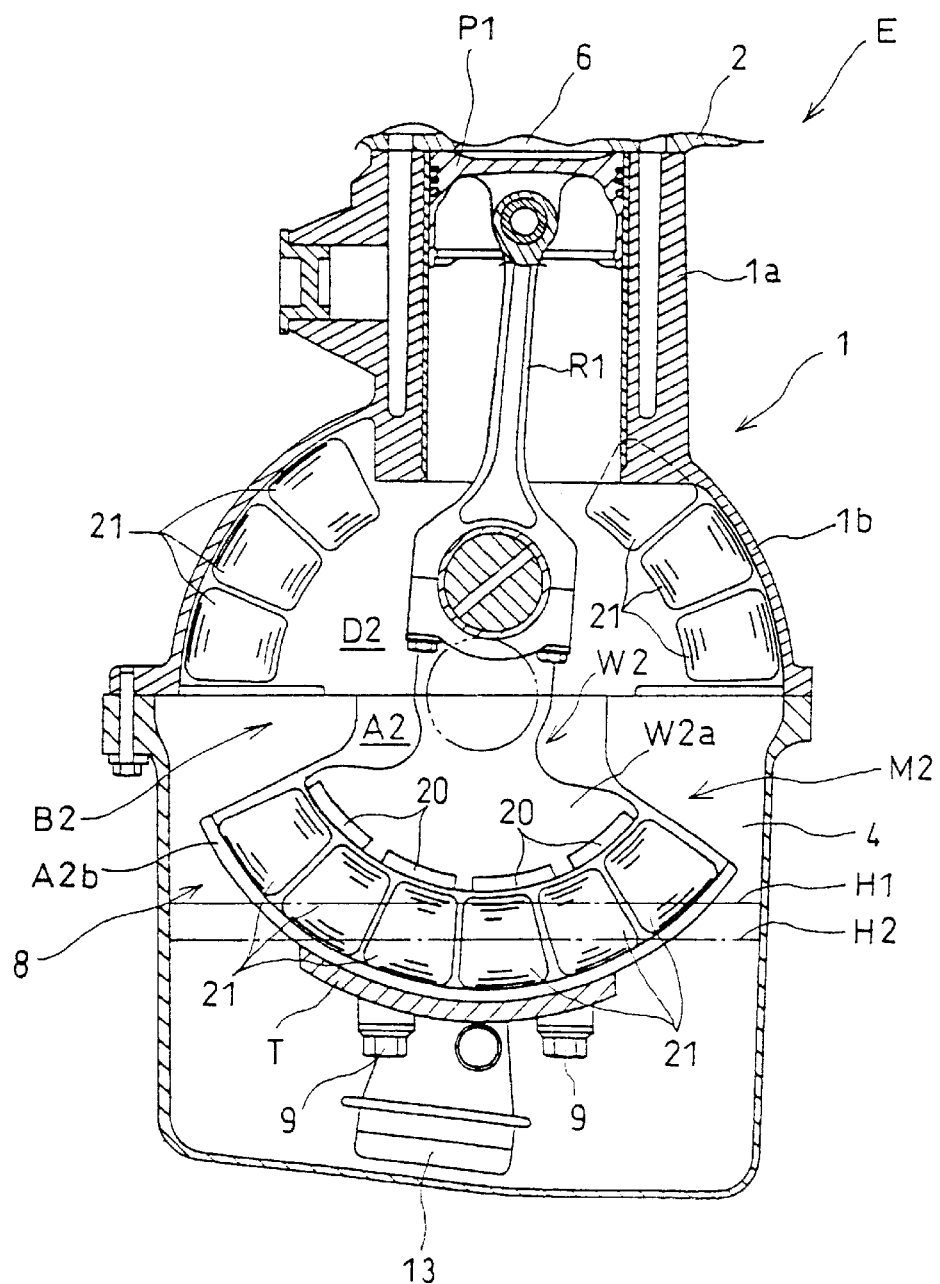
FIG. 6 is a sectional view, similar to FIG. 2, of an internal combustion engine in a third embodiment according to the present invention.

An internal combustion engine in a third embodiment according to the present invention will be described with reference to FIG. 6, in which parts like or corresponding to those of the internal combustion engine in the first embodiment are denoted by the same reference characters and the description thereof will be omitted.

In the internal combustion engine in the third embodiment, three coils 21 and three coils 21 are disposed symmetrically with respect to a vertical plane including the axis L of a crankshaft 5 on the inner surface of a crankcase 1b forming a crank chamber so as to be diametrically opposite to permanent magnets 20 on each of the balance weights W1a to W6a in addition to six coils 21 fixedly held on each of bearing cap bodies A1 to A4. The coils 21 held on the inner surface of the crankcase 1b are disposed so as a small radial gap G is formed between the inner surfaces of the coils 21 and the permanent magnets 20.

The third embodiment has the following effects in addition to those of the first embodiment. Even though the electromechanical transducers M1 to M6 are incorporated into the internal combustion engine E, increase in the size of the internal combustion engine E is suppressed because the additional coils 21 are held on the inner surface of the crankcase 1b. Since the number of the coils 21 that interact with the permanent magnets 20 when the crankshaft 5 is turned one full turn is greater than that experienced by permanent magnets 21 of the first embodiment, an increase assist force is available and an increased amount of power can be generated.

Figure 7:
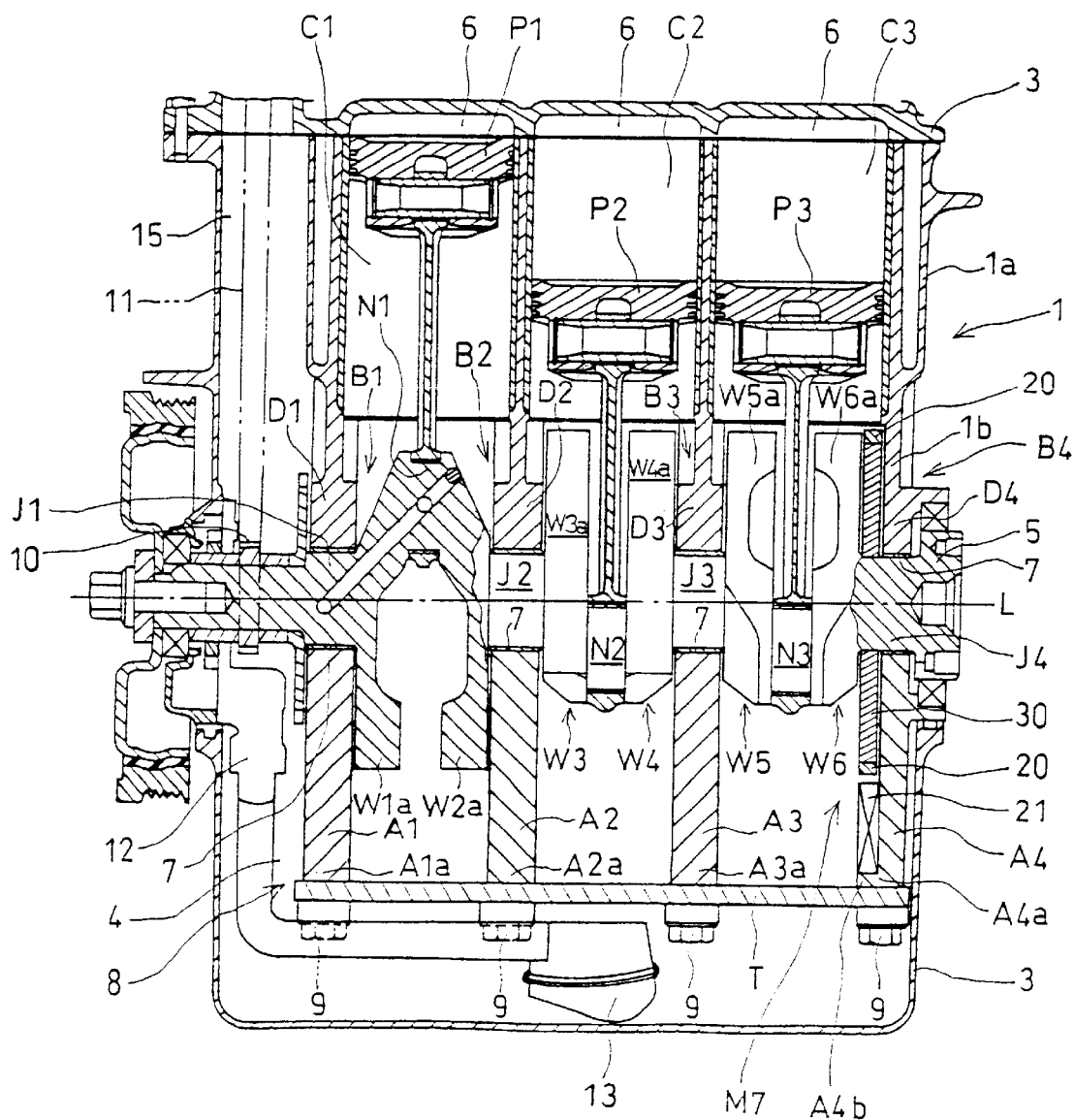
FIG. 7 is a sectional view, similar to FIG. 1, of an internal combustion engine in a fourth embodiment according to the present invention.

An internal combustion engine in a fourth embodiment according to the present invention will be described with reference to FIG. 7, in which parts like or corresponding to those of the internal combustion engine in the first embodiment are denoted by the same reference characters and the description thereof will be omitted.

In the fourth embodiment, a disk-shaped rotor 30 is fixedly mounted at a part near a journal J4 adjacent to a crank web W6 on a crankshaft 5. Permanent magnets 20 are attached at intervals to the circumference of the rotor 30. Six coils 21 are arranged on a flange A4b formed in a bearing member A4, in an arrangement similar to the arrangement of the coils on the bearing part A4 in the first embodiment so as to correspond to the rotor 30 and to form a radial gap G between the permanent magnets 20 and the coil 21.

The fourth embodiment has the following effects in addition to those of the first embodiment. The internal combustion engine E is provided wit a single electromechanical transducer M7. Although the coils 31 are arranged on a circular arc, the variation of the rotation of the crankshaft 5 due to the assisting force exerted on the crankshaft 5 by the electromechanical transducer M7 because the permanent magnets 20 are arranged on the entire circumference of the rotor 30.

Modifications of the foregoing embodiments will be described hereinafter.

In the first embodiment, the connecting member T connecting the bearing cap bodies A1 to A4 is attached to the peripheral parts A1a, A2a, A3a and A4a of the bearing cap bodies A1 to A4. When the connecting member T is disposed so as to avoid interference between the connecting member T and the crank webs W1 to W6 including the balance weights W1a to W6a, the connecting member T does not necessarily be attached to the peripheral parts A1a, A2a, A3a and A4a of the bearing cap bodies A1 to A4. Even if the connecting member T is thus disposed, the coils 21 can be disposed at a long distance from the axis L of the crankshaft 5, the electromechanical transducers M1 to M6 are able to function as electric motors capable of producing a large assisting torque to assist the rotation of the crankshaft 5.

Although the bearing cap bodies A1 to A4 are provided with the flanges A1b, A2b, A2c, A3b, A3c and A4b in the first to the third embodiment, the coils 21 of the electromechanical transducers M1 to M6 may be attached to the connecting member T and the flanges A1b, A2b, A2c, A3b, A3c and A4b may be omitted. When the coils 21 are attached to the connecting member T connecting the peripheral parts A1a to A4a of the bearing parts A1 to A4, the distance between the axis L of the crankshaft 5 and the coils 21 can be increased by a vale equal to the radial thickness of the flanges A1b, A2b, A2c, A3b and A4b, and therefore, the permanent magnets 20 can be disposed at an increased distance from the axis L. Consequently, the electromechanical transducers M1 to M6 are able to function as electric motors capable of producing a large assisting torque by the assisting force assisting the rotation of the crankshaft 5 and are able to function as generators, in which the permanent magnets 20 move at a high circumferential speed, capable of generating power at a high efficiency. Since the coils 1 are attached to the connecting member T for enhancing the rigidity of the bearing cap bodies A1 to A4, the coils 21 are held firmly on the rigid connecting member T, which is advantageous to maintaining the gap G between the permanent magnet 20 and the coils 21 constant. Similarly, in the fourth embodiment, the flange A4b of the bearing part A4 may be omitted, the coil 21 of the electromechanical transducer M7 may be attached to the connecting member T.

In the third embodiment, the coils 21 may be attached only on the crankcase 1b without attaching any coil to the bearing cap bodies A1 to A4.

The coil may be disposed at any positions in the crank chamber 4, provided that a fixed gap is formed between the permanent magnets 20 and the coils 21.

Although the rotor 30 is disposed axially adjacent to the bearing structure B4 in the fourth embodiment, the rotor 30 may be mounted at any suitable position on the crankshaft 5 in the crank chamber 4. In such a case, an additional journal may be formed in the crankshaft 5, the additional journal may be supported in an additional main bearing, and the rotor 30 may be supported at a part between the additional main bearing, and the bearing structure B1 or B4 on the crankshaft 5. Since a part of the crankshaft 5 supporting the rotor 30 is supported at the opposite ends, the bending of the crankshaft 5 can be suppressed. If the rotor 30 is formed integrally with the balance weight W6a of the crankshaft 5, the number of parts can be reduced.

The internal combustion engine may be a multicylinder internal combustion engine other than a single-cylinder or three-cylinder internal combustion engines. In an internal combustion engine having four or more cylinders, it is easily to make the permanent magnets 20 held on the crank webs and the coils 21 associated with the permanent magnets 20 of some of the electromechanical transducers face each other while the internal combustion engine is in operation. Thus, the assisting operation of an electric motor and regenerating operation of a generator can be stably achieved.

Although the bearing cap 8 of the foregoing embodiments is provided with the connecting member T, the connecting member T may be omitted. If a lower block, i.e., a crank chamber forming member, is interposed between the cylinder block 1 and the oil pan 3, the bearing cap 8 may be formed integrally with the lower block, which enhances the rigidity of the support structure for supporting the coils 21 and the gap G can be easily maintained constant.

The permanent magnets 20 in the foregoing embodiments come opposite to the coils 21, forming the radial gap G between the permanent magnets 20 and the coils 21. The permanent magnets 20 may be attached to the side surfaces of the crank webs, and the coils 21 may be attached to the side surfaces of the bearing cap bodies, so that the permanent magnets 20 and the coils are disposed axially opposite to each other with an axial gap formed between the permanent magnets 20 and the coils 21.

The coils 21 may be held on the entire circumference of the bearing parts so as to face the balance weights or the rotor 30. Although some of the coils 21 held on the bearing cap 8 are immersed in the oil contained in the oil pan 3 in the foregoing embodiments, all the coils 21 may be partly or entirely immersed in the oil.

Although the permanent magnets 20 and the coils 21 form the electromechanical transducers each capable of functioning as an electric motor and a generator in the foregoing embodiments, the permanent magnets 20 and the coils 21 may form motors incapable of power generation or a generator. The electric motor or the generator according to the present invention may be any type of ac electric motor or any type of dc generator.

What is claimed is:

1. An internal combustion engine comprising: a cylinder block, a crankshaft, a bearing cap fastened to the cylinder block so as to hold the crankshaft for rotation on the cylinder block, and a crank chamber forming member forming a crank chamber;

wherein magnetic field creating members are fixed to parts of the crankshaft in the crank chamber so as not to move relative to the crankshaft, coils are held on the bearing cap in the crank chamber, and the magnetic field creating members and the coils form at least electric motors, generators or electromechanical transducers.

2. The internal combustion engine according to claim 1, wherein the bearing cap comprises a plurality of bearing cap bodies, and a connecting member connecting the bearing cap bodies, and the coils are disposed on the side of an axis of the crankshaft with respect to the connecting member.

3. The internal combustion engine according to claim 1, wherein the bearing cap includes a plurality of bearing cap bodies and a connecting member connecting the bearing cap bodies, and the coils are held on the connecting member.

4. The internal combustion engine according to claim 1, wherein the magnetic field creating members are held on balance weights included in the crankshaft.

5. The internal combustion engine according to claim 4, wherein said balancing parts are each in the form of a sector and said magnetic field creating members are each held on a peripheral part of each of said balancing parts, said peripheral part being most apart from a rotational axis of the crankshaft.

6. The internal combustion engine according to claim 1, wherein the crank chamber forming members include an oil pan, and the coils are immersed in oil contained in the oil pan.

7. An internal combustion engine comprising:

a cylinder block, a crankshaft, a bearing cap fastened to the cylinder block so as to hold the crankshaft for rotation on the cylinder block and a crank chamber forming member forming a crank chamber;

wherein magnetic field creating members are fixed to parts of the crankshaft in the crank chamber so as not to move relative to the crankshaft, coils are held on the bearing cap in the crank chamber and on the crank chamber forming member in the crank chamber, and the magnetic field creating members and the coils form at least electric motors, generators or electromechanical transducers.

8. The internal combustion engine according to claim 7, wherein the coils are held on coil holders disposed in the crank chamber so that a gap between the magnetic field creating members and the coils can be maintained constant.

9. The internal combustion engine according to claim 7, wherein the magnetic field creating members are held on balance weights included in the crankshaft.

10. The internal combustion engine according to claim 9, wherein said balancing parts are each in the form of a sector and said magnetic field creating members are each held on a peripheral part of each of said balancing parts, said peripheral part being most apart from a rotational axis of the crankshaft.

11. The internal combustion engine according to claim 7, wherein the crank chamber forming members include an oil pan, and the coils are immersed in oil contained in the oil pan.

12. The internal combustion engine according to claim 1, wherein said coils are fixedly held on a radially outer side of said bearing cap at positions opposite to the magnetic field creating members, respectively, along a circular arc extending peripherally of said radially outer side.

13. The internal combustion engine according to claim 1, wherein said coils are provided at such positions that they are in contact with on oil that lubricates a bearing structure for the crankshaft.

14. An internal combustion engine comprising:

a cylinder block, a crankshaft, a bearing cap fastened to the cylinder block to hold the crankshaft for rotation on the cylinder block, and a crank chamber forming member defining a crank chamber;

wherein magnetic field creating members are fixed to a periphery of a disk-shaped rotor mounted to the crankshaft in the crank chamber so as to rotate with the crankshaft, coils are held on the bearing cap in the crank chamber so as to confront said periphery of the disk-shaped rotor, and the magnetic field creating members and the coils form at least electric motors, generators or electromechanical transducers.

15. An internal combustion engine comprising:

a cylinder block, a crank shaft having balance weights, and a crank chamber forming member defining a crank chamber;

wherein magnetic field creating members are fixedly attached to said balance weights;

coils are fixedly held at both an upper position and a lower position within said crank chamber, and the magnetic field creating members and the coils form at least electric motors, generators, or electromechanical transducers.

16. The internal commotion engine according to claim 15, wherein each of said balance weights has a radially outer peripheral part, and said magnetic field creating members are disposed along said radially outer peripheral part of each balance weight.

17. The Internal Combustion Engine according to claim 15, wherein said magnetic field creating members are permanent magnets.

* * * * *